United States Patent [19]

Kaufman

[11] 4,129,443
[45] Dec. 12, 1978

[54] METHOD FOR IMPROVING THE SINTERABILITY OF IRON POWDER DERIVED FROM COMMINUTED SCRAP METAL

[75] Inventor: Sydney M. Kaufman, Livonia, Mich.

[73] Assignee: Ford Motor Company, Dearborn, Mich.

[21] Appl. No.: 735,468

[22] Filed: Oct. 26, 1976

Related U.S. Application Data

[63] Continuation-in-part of Ser. No. 584,563, Jun. 6, 1975, abandoned, and Ser. No. 584,564, Jun. 6, 1975, abandoned, and Ser. No. 637,350, Dec. 3, 1975, abandoned.

[51] Int. Cl.$^2$ .......................... B22F 1/02; B02C 11/08
[52] U.S. Cl. .......................... 75/212; 75/200; 75/211; 75/213; 75/214; 75/224; 241/23; 241/DIG. 37; 264/111; 427/11; 427/216; 427/217; 427/242
[58] Field of Search ................ 75/212, 213, 200, 211, 75/214, 224; 241/23, DIG. 37; 427/11, 242, 216, 217; 264/111

[56] References Cited

U.S. PATENT DOCUMENTS

| | | | |
|---|---|---|---|
| 2,378,588 | 6/1945 | Skehan et al. | 427/11 |
| 3,013,892 | 12/1961 | Songas | 427/242 |
| 3,223,523 | 12/1965 | Adler | 75/212 |
| 3,251,711 | 5/1966 | Pottberg et al. | 427/242 |
| 3,768,739 | 10/1973 | George | 241/DIG. 37 X |
| 3,771,729 | 11/1973 | Frable | 241/DIG. 37 X |
| 3,838,982 | 10/1974 | Sanderow et al. | 75/212 X |
| 4,011,077 | 3/1977 | Kaufman | 75/212 |
| 4,015,780 | 4/1977 | Hall | 241/DIG. 37 X |
| 4,018,633 | 4/1977 | Holland | 241/23 X |
| 4,024,295 | 5/1977 | Chase et al. | 427/216 X |

FOREIGN PATENT DOCUMENTS

| | | | |
|---|---|---|---|
| 843378 | 6/1970 | Canada | 427/242 |

*Primary Examiner*—Richard E. Schafer
*Attorney, Agent, or Firm*—Joseph W. Malleck; Olin B. Johnson

[57] ABSTRACT

Methods are disclosed for embrittling scrap metal for comminution and for subsequent or simultaneous treatment of the comminuted metal powder to improve sintering kinetics and prevent oxidation of alloying ingredients. A first embrittling method impacts the scrap metal at a temperature below its ductile-brittle transition temperature to cryogenically provide scrap metal powder. The scrap metal is subjected to two impacting operations (such as by use of a ball milling machine), the first operation being carried out simultaneously with the cryogenic medium and the second impacting operation is carried out at ambient temperature conditions utilizing milling elements which impart cold work to at least a portion of the cryogenic powder. An anti-oxidation agent, such as copper or iron, is mechanically transferred to substantially each particle of said cryogenic powder during the second operation to form a continuous copper or iron envelope thereabout. The coated cryogenic powder is then compacted and sintered; the sintered product may be subjected to hardening or tempering treatments if desired. Also disclosed is a continuous method for carrying out both cryogenic embrittlement impaction, and coating. A mass of liquid $N_2$ and metal pieces are circulated in a properly oriented tube so that in one zone a true slurry exists with liquid $N_2$ in intimate contact with the metal pieces; in another zone the metal pieces are withdrawn from the slurry to momentarily increase in temperature. Fragmenting occurs substantially in said one zone and cold-working substantially in said another zone, while progressive anti-oxidation coating of the comminuted particles occurs in both zones.

A second embrittling method involves dissolving the carbon in ferrous scrap metal having a critical predetermined carbon content, quenching the metal to produce substantially all martensite, and impacting the treated metal while simultaneously coating with an anti-oxidizing agent.

58 Claims, 10 Drawing Figures

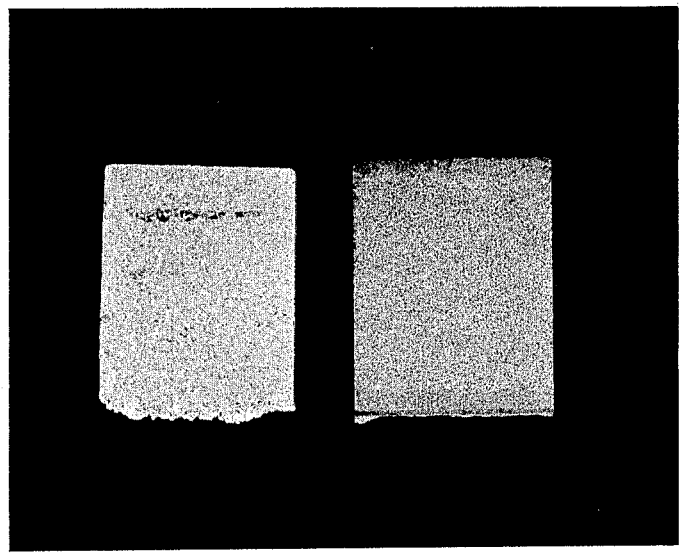
FIG. 2.
FIG. 3.
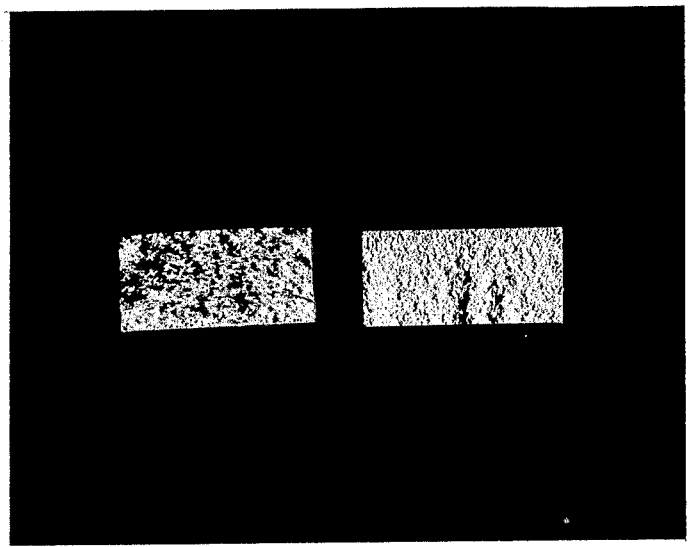

METHOD FOR IMPROVING THE SINTERABILITY OF IRON POWDER DERIVED FROM COMMINUTED SCRAP METAL

CROSS-REFERENCE TO RELATED APPLICATION

This is a continuation-in-part and amalgamation of my U.S. application Ser. No. 584,563, filed June 6, 1975, Ser. No. 584,564, filed June 6, 1975, and Ser. No. 637,350, filed Dec. 3, 1975, all commonly assigned to the assignee herein and all abandoned.

BACKGROUND OF THE INVENTION

Incentives for Solid State Scrap Conversion

There are strong economic as well as ecological incentives favoring development of a process for the direct conversion of machine scrap or swarf into a powder which can be utilized by the ferrous powder metallurgy industry. At Ford Motor Company alone as estimated 105,000 tons of low alloy steel machine turnings are generated by the various manufacturing plants and sold as scrap on the open market, destined to be part of a furnace charge in some ferrous melting operation. Its utility, even as a furnace charge material, is limited by high bulk-to-weight ratios and residual machine oil content. The alloying elements present in most of this kind of scrap represent a valuable resource if they could be economically recovered. In melting operations much of this alloy content is oxidized and lost to slag. The ecological advantages of direct conversion of swarf to powder with no intermediate melting operation stem from use of a cleaner, less polluting process and the theoretical 100% recovery of valuable alloying elements. Economically, direct conversion is also very attractive. Based on current prices for iron powders or prealloyed iron powders and the price of swarf on the open market, a significant differential is available for conversion costs and profit. In spite of these incentives, technological problems exist which have thwarted previous attempts to employ powder made from swarf in standard powder metallurgy sintering operations.

Problems

It is well known that ordinary carbon or low alloy steel compositions (those used in formulating alloy metals by melting) are incompatible with the sintering processes currently employed in this country. At temperatures of 1120°–1148° C. (2050°–2100° F.) under furnace atmospheres of endothermic generator gas, elements such as silicon, manganese, chromium and vanadium can oxidize at the surfaces of powder particles and create a barrier to the establishment of sinter bonds between particles. As a result, makers of powder metallurgy steels for sintered parts are forced to employ a limited number of elements not easily oxidized under these conditions, such as nickel, copper, and molybdenum. Some prealloyed powder metallurgy steels designed for sintering and hot forming are currently available with decreased manganese concentrations and only trace amounts of chromium or silicon. Hardenability of the latter prealloyed powders is enhanced by use of additional copper, nickel or molybdenum.

Chemical composition does not present the only deterrent to a direct conversion process from swarf to powder. Most of the energy required in mechanically comminuting brittle materials to powder is for comminution by brittle fracture. Energy input, therefore, is related solely to the new surface area created. Steel scrap, being quite malleable, undergoes considerable plastic deformation during most mechanical comminution processes. Energy requirements for comminution of steel, as a result, are considerably greater than for an equivalent brittle material, with large accompanying heat losses. The work hardening that accompanies excessive plastic deformation would also make the product powder difficult to mold, necessitating expensive annealing to restore compressibility properties. The ductility of steel swarf tend to make powders produced by conventional mechanical comminution coarse and flake-shaped. The unusual shape and particle size distribution detracts also from compressibility as well as green strength, flow properties and the ability to reproduce fine detail from the compacting die.

One approach to overcoming the energy problem is to employ cryogenics, cryogenic powder making is a relatively new mode of providing a powdered raw material which can be put to use in powder metallurgy techniques and other applications. Cryogenic powder holds great promise because it can provide powdered material at a significantly lower cost and it may result in more useable physical properties, if not enhanced physical properties, for a sintered powdered part.

Essentially cryogenic powder making comprises subjecting scrap metal, or other solid starting metal material, to a temperature below the ductile-brittle transition temperature of said metal, such as $-(30°-40)°$ F. for ferrous based material. The metal becomes so brittle at such depressed temperatures that agitation within a conventional ball mill will reduce the scrap or starting metal material to a powder form over a predetermined period of time and stress from the ball milling elements. At the same time, any oil or other organic materials coating the scrap metal, particularly scrap metal in the form of machine turnings, will also freeze and be removed during the impaction by the ball milling elements; such frozen debris can be screened and separated.

To insure that the scrap metal is in the embrittled condition at the point of impaction, it is necessary to direct a supply of liquid nitrogen against the scrap metal immediately prior to introducing the scrap metal into the mill itself. The comminuted particles resulting from a predetermined amount of ball milling under such embrittled conditions, produces metal particle shapes which are irregular, not spherical. The layer-like or flake configuration results from the two facts: (a) the scrap metal was machine turnings which have a thin ribbon-like configuration with a large surface-to-volume ratio, and (b) comminution takes place by fracture insuring irregularity of small broken sections of the ribbon resembling flakes. Expensive annealing and further ball-milling is required by the prior art.

When such cryogenically produced powder (which contain Mn and Si since it is derived from typical SAE grade melted metal scrap) is subjected to conventional powder metallurgy techniques, with a compacted quantity of such powder being heated to a sintering temperature, oxidation of ingredients such as manganese and silicon will typically take place prior to diffusion and completion of the sintering step. Such oxidation results because these elements require more sintering atmosphere control than is normally possible in current, more stringent operations. Moreover, such powder, when mixed with alloy powders or higher carbon powders demand an uneconomical and inefficient sintering temperature with attendant loss of hardenability.

SUMMARY OF THE INVENTION

A primary object of this invention is to provide an improved method of making sintered shapes from ferrous based metal particles containing oxidizable ingredients, which method not only decreases the energy and cost requirements of the mode of comminution of the metal, but also improves the diffusion kinetics for sintering of the comminuted metal into a desired shape. Other method objects of this invention comprise (a) a method of making an intermediate powder useful in powder metallurgy techniques, (b) an intermediate powder composition made from scrap machine turnings, and (c) a method of making a cold compacted shape which can be shipped as a commodity useful in subsequent sintering techniques to make a stable permanent metal part.

Another object is to provide improved methods of comminuting ferrous scrap metal and to prepare said comminuted metal for protection against oxidation in later heat treatments. One aspect of this object is to achieve desired results by improved cryogenic processing and in particular by a single step continuous method of cryogenic processing. Another aspect of this object is to achieve desired results by improved heat treat embrittlement and in particular by conversion of the scrap metal to substantially all martensite for facilitating comminution, sintering kinetics and anti-oxidation protection.

Another principal object of this invention is to upgrade the physical properties of comminuted powder and in certain respects to surpass the physical properties of any carbon steel type powder irrespective of whether it is atomized, heat treatment embrittled, or cryogenically produced.

Yet still another object of this invention is to produce a powder derived from a variety of scrap metal pieces traditionally not useable in scrap melting techniques, the powder so produced being completely substitutable for current commercially made metal powder.

Specific features pursuant to the above objects comprise: (a) to provide a method, optimally a single step or continuous one, for conversion of machine scrap turnings (containing oxidizable ingredients) into a powder suitable for powder metallurgical techniques, the ferrous scrap pieces are circulated and subjected to impact in one zone of the circulation while at a temperature below the ductile-brittle transition temperature and the pieces are cold worked in another zone of said circulation while allowed to rise momentarily above said ductile-brittle transition temperature and the pieces are cold worked in another zone of said circulation while allowed to rise momentarily above said ductile-brittle transition temperature; (b) cryogenically produced powder is repeatedly impacted to promote a thin copper or iron shell about substantially each particle of said powder and to provide at least one defect site in each particle of said powder which is in excess of 124 microns; (c) cryogenically produced powder is coated and cold-worked in a manner to prevent oxidation of alloying ingredients, such as manganese and silicon, during subsequent heat treatment; (d) ferrous scrap metal selected to be hypoeutectoid is heated to dissolve all carbon, quenched at rate to promote martensite throughout, and repeatedly impacted to comminute, cold-work and coat by impact transfer to produce a desired powder; (e) imparting strain to a sufficient number of powder particles so as to improve atomic diffusion during sintering of said powder, and (f) significantly increasing shrinkage of said sintered powder as a result of improved diffusion kinetics.

SUMMARY OF THE DRAWINGS

FIG. 2 is a photograph of two sintered shapes, one comprised of cryogenically produced powder processed according to the steps of FIG. 1, and the other comprising conventionally produced atomized ferrous based powder processed according to the prior art;

FIG. 3 is a photograph of the fracture surface along one end of each of the specimens illustrated in FIG. 2;

DETAILED DESCRIPTION

Cryogenic Embrittlement

Figure 1:
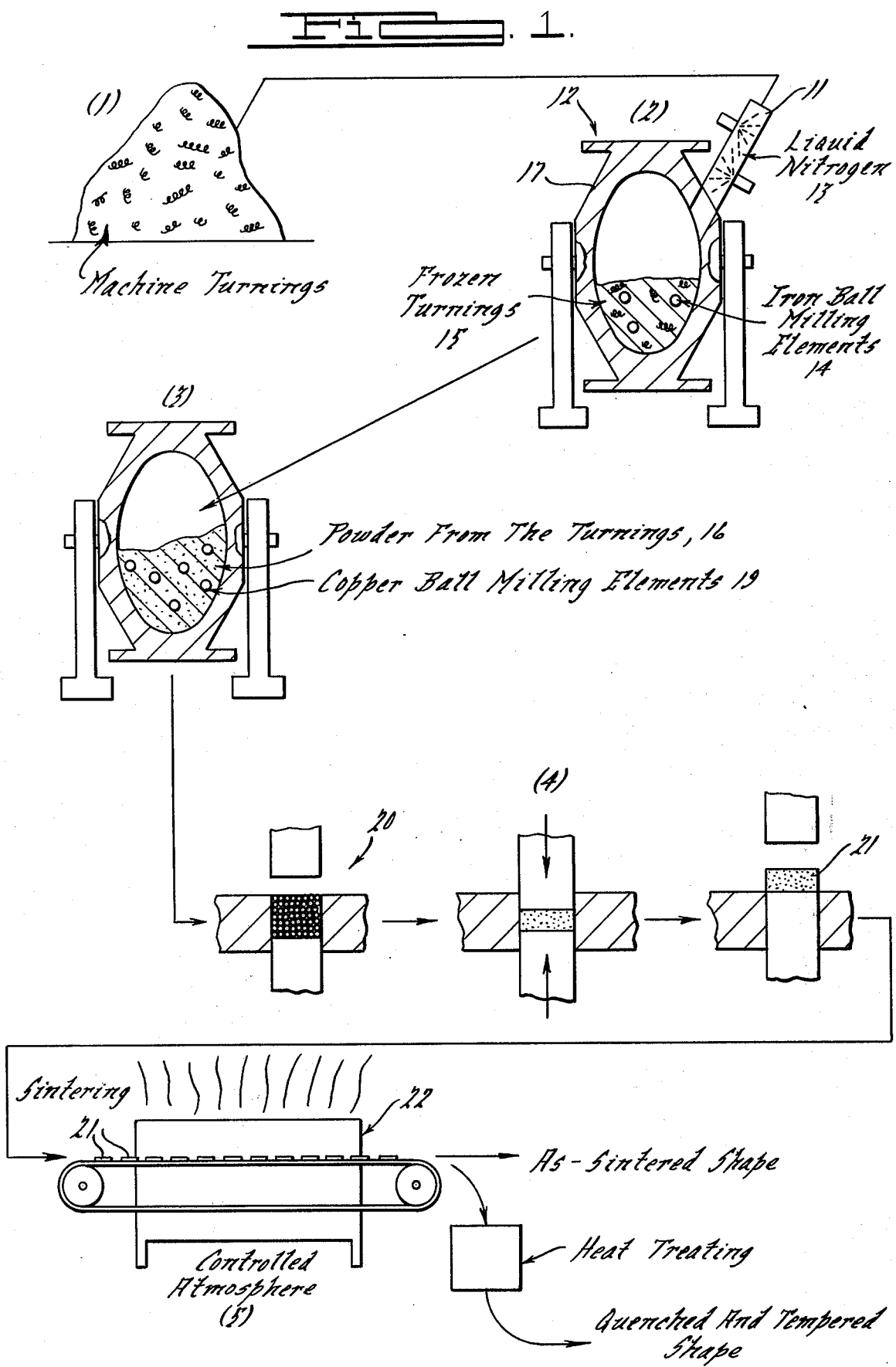
FIG. 1 is a schematic flow diagram of one method mode of this invention.
Figure 4:
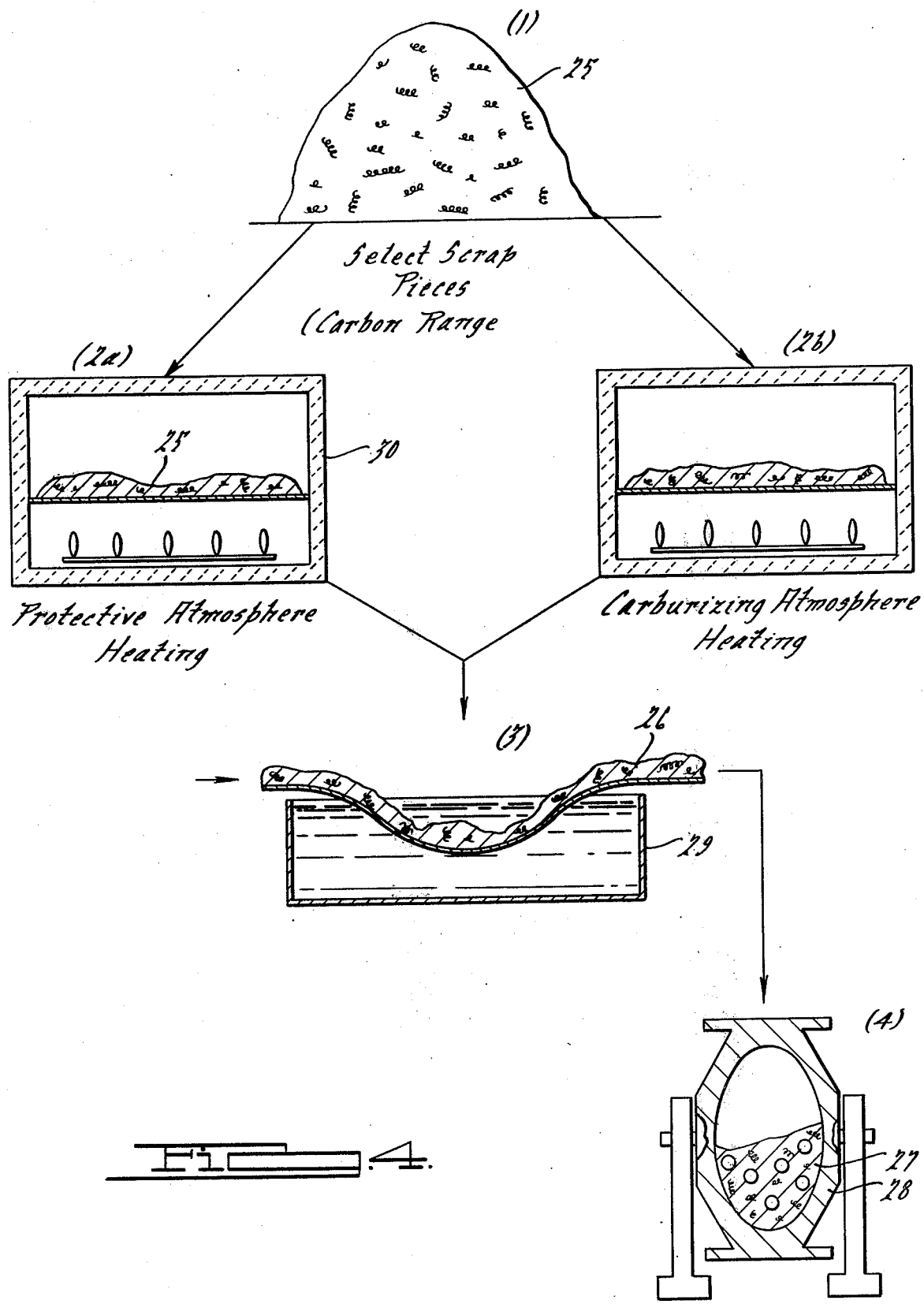
FIG. 4 is a schematic flow diagram of another method mode of this invention.

A preferred mode for carrying out the method aspects of this invention is depicted in FIG. 1 and is as follows:

(1) Scrap metal and particularly machine turnings 10 are selected as the starting material. "Machine turnings" is defined herein to mean segments of ribbons of low alloy steel. They typically are shavings cut from alloy bar (produced by melting to a conventional SAE designation). But machine turnings, preferably ferrous based, include alloying ingredients such as manganese, silicon, chromium, nickel and molybdenum. The turnings should be selected to have a surface-to-volume ratio of at least 60:1, which is characteristic of machine turnings. The scrap pieces will have a size characterized by a width 0.1–1.0 inches, thickness of 0.005–0.03 inches, and a length of 1–100 inches. Machine turnings are usually not suitable for melting in an electric furnace because they prevent efficient melt down due to such surface-to-volume ratio.

This process can be performed with other types or larger pieces of scrap metal, although capital investment costs may increase due to the difficulty of impacting scrap metal sized in particle pieces beyond 0.03 inch thick. The scrap pieces should be selected to be generally compatible in chemistry as combined in the final product; this is achieved optimally when the scrap is selected from a common machining operation where the same metal stock was utilized in forming the turnings.

(2) The selected scrap pieces 10 are then put into a suitable charging passage 11 leading to a ball milling machine 12 or equivalent impacting device. Within the passage, means 13 for freezing such metal pieces is introduced, such as liquid nitrogen; it is sprayed directly onto the metal pieces. Mere contact of the liquid nitrogen with the scrap pieces will freeze them instantly. The application of the liquid nitrogen should be applied uniformly throughout its path to the point of impaction. The iron ball milling elements 14 are motivated preferably by rotation of the housing 17, to contact and impact the frozen pieces 15 of scrap metal causing them to fracture and be comminuted. Such impaction is carried out to apply sufficient fracturing force (defined to mean less than 1 ft.-lb.) and a a sufficient period of time and rate to reduce said scrap pieces to a powder form. The powder 16 will typically have both a coarse and a fine powder proportion. Both proportions will be comprised of particles which are flake or layered in configuration; each particle will be highly irregular in shape and dimension, none being spherical in shape. A typical screen analysis for the powder 16 after step (2) would be as follows (for a 100 gram sample):

| Mesh | No Milling (in grams) | After 72 Hrs. (in grams) |
|---|---|---|
| 60 | 60.0 | 31.5 |
| 100 | 19.5 | 11.0 |
| 140 | 5.5 | 7.5 |
| 200 | 6.5 | 18.0 |
| 325 | 4.5 | 22.5 |
| 325 | 4.0 | 9.5 |

(3) The comminuted cryogenic powder 16 is then subjected to another impacting step, but this time at ambient temperature conditions. The powder is placed preferably in another ball milling machine, the machine having elements 19 laden with a special anti-oxidation coatable agent, such as copper or iron. The elements are preferably in the form of solid balls of about 0.5 inch in diameter and consisting of iron or copper. The coatable protective agent should be characterized by (a) a hardness less than that of the coated powder to promote transfer to said particles upon impact between said elements and particles, (b) being completely soluble in the metal of the particles, (c) easy to abrade, and (d) acts as an oxidation barrier.

In trials performed herein, the interior chamber was a 3 inch × 6 inch cylinder, powder charge was 10 in.$^3$, and the milling time was about 48 hours. Milling time and rate depend on mill volume, mill diameter size of copper or iron balls and the speed of rotation. The function of this second impacting step is two-fold: to provide an oxidation barrier on each powder particle and to cold work each coarse particle. The balls transfer, by impact, a portion of the copper or iron ingredient carried by the ball milling elements 19 so as to form a copper or iron shell about substantially each particle of the powder 16. The finer powder will obtain a copper or iron or a combination coating by true abrasion or scratching with the surface of the ball milling elements 19. Ball milling elements 19 should have a diameter at least 50 times the largest dimension of any of the particle shapes of the cryogenic powder 16. The ball milling operation also must generate non-natural defect sites (resulting from cold working) in substantially all powder particles above 124 microns; the ball milling operation herein should be carried out so that substantially each coarse particle has at least one defect site therein. This can be accomplished by rotating the housing 20 to impart a predetermined abrading force from the balls 19. Assurance of cold work in substantially all coarse particles is obtained by following ball milling techniques described in the Handbook for Chemical Engineers, Ball milling section, incorporated herein by reference; physical stressful contact can be made between all coarse particles by observing the relationship between time, mass and container shape.

When this step is completed, the particles will be in a condition where substantially all will have a continuous copper or iron or combination envelope (coating or shell) and be stressed sufficiently so as to have a high degree of cold work. The term "defect site" is defined herein to mean a defect in local atomic arrangement. The term "shell" is defined herein to mean a substantially continuous thin envelope intimately formed on the surface of the particle. Although the shell should preferably be an impervious continuous envelope about each particle, it is not critical that it be absolutely impervious. It has been shown, by the test examples performed in connection with reducing this invention to practice, that cold working of the particles is predominantly influential in increasing diffusion kinetics of this invention, the copper or iron coating or shell operating to predominantly form an antioxidation barrier.

(4) A predetermined quantity of powder conditioned from step (3) is compacted by a conventional press 20 to a predetermined density, preferably about 6.6 g./cc. This is brought about by the application of forces in the range of 30-35 tsi. The presence of the copper or iron envelope about the powder particles improves compressibility. With prior uncoated powders, a density of about 6.4 g./cc. is typically obtained using a compressive force of 85,000 psi; with the powder herein, densities of about 6.6 g./cc. are now obtained at the same force level.

The shape 21 into which such powder is compacted is designed to have an outer configuration larger than that desired for the final part. A significant and highly improved shrinkage takes place as a result of the next step (5); the shrinkage can be a predetermined known factor and allowance can be made in the compacted shape 21 of this step. Shrinkage will be in the controlled limits of 0–15%.

(5) The compacted shape 21 is subjected to a sintering treatment within a furnace 22 wherein it is heated to a temperature preferably in the range of 2000°–2100° F., for ferrous based cryogenic powder. The temperature to which the compact is heated should be at least the plastic region (typically sintering temperature) for the metal constituting the powder. A controlled or protective atmosphere is maintained in the furnace, preferably consisting of inert or reducing gases.

At the sintering temperatures, atomic diffusion takes place between particles of the powder particularly at solid contact points therebetween; certain atoms of one particle are supplied to fill the defect sites or absence of certain atoms in the crystal structure of the contacting particle, said defect sites being present as a result of cold working in step (3). Diffusion is accelerated to such an extent, that an increase of more than 100 times is obtained. It is theorized that at least 60% of the improvement in physical properties of the resulting sintered shape is due to the controlled cold working of the coarse powder particles. The increased diffusion is responsible for the increase in shrinkage.

The copper or iron envelope on the particles serves to essentially prevent oxidation of certain elements or ingredients within the powder particles, particularly manganese and silicon. With typical ball milling parameters (physical size of mill, speed change and ball size) sufficient to the job, it can be statistically calculated that substantially each particle of the cryogenic powder will possess an impervious copper or iron shell. However, a totally impervious shell is not absolutely essential to obtaining an improvement of some of the properties herein.

As a basis for comparison, several as-sintered test samples were prepared. The procedure for preparing the test samples was varied to investigate aspects such as the effect of cold working, the influence of a copper or iron coating without cold working, the manner in which the copper or iron coating is applied, and the influence of particle size. All of the test samples were prepared according to the following fabrication and thermal treatment except as noted. A cryogenically produced powder quantity was admixed with 1% zinc stearate (useful as die wall lubricant) and 0.7–0.8% graphite. The admixture was compacted at a pressure of 25 tons/sq. in. into standard M.P.I.F. transverse rupture strength bars. The bars were preheated at 1450° F. for 20 minutes to burn off the lubricants, the heating was carried out in an endothermic type atmosphere at a 45° F. dew point. Sintering was carried out at a higher temperature in the same endothermic atmosphere for an additional 20 minutes.

The first three samples are considered representative of the prior art as a reference base since no separate cold working or copper or iron coating was employed.

| Sample No. | Sintering Temp. (° F) | Transverse Rupture Strength (psi) | Hardness ($R_B$) | As-Sintered Density |
|---|---|---|---|---|
| 1 | 2050 | 16,000 | 62 | 6.5 |
| 2 | 2075 | 20,000 | 68 | 6.6 |
| 3 | 2100 | 22,000 | 73 | 6.6 |

To investigate the effect of cold working, the powder ball milled was in a mill employing steel balls; the ball milling time as varied for each of the three samples in the following sequence: 20 hours, 44 hours and 96 hours.

| Sample No. | Sintering Temp. (° F) | Transverse Rupture Strength (psi) | Hardness ($R_B$) | As-Sintered Density |
|---|---|---|---|---|
| 4 | 2100 | 28,000 | — | 6.6 |
| 5 | 2100 | 46,000 | — | 6.6 |
| 6 | 2100 | 59,000 | — | 6.3 |

To further separate or analyze the effect of fine particle sizes, the starting material was not milled but rather it was screened so as to pass fine particles through a 100 mesh screen. The screened fine particles were then subjected to the treatment outlined above. The results showed:

| Sample No. | Sintering Temp. (° F) | Transverse Rupture Strength (psi) | Hardness ($R_B$) | As-Sintered Density |
|---|---|---|---|---|
| 7 | 2100 | 25,000 | 20–25 | 5.8 |

An investigation of the influence of copper or iron coating, by itself, without cold working from ball milling elements, was pursued. A copper coating was applied chemically to the particles of the cryogenic powder; for the following first three samples, the coating was applied electrolytically using a copper sulphate ($CuSo_4$) salt in the electroplating bath and the next two samples were prepared utilizing a copper nitrate ($CuNo_3$) salt.

| Sample No. | Sintering Temp. (° F) | Transverse Rupture Strength (psi) | Hardness ($R_B$) | As-Sintered Density |
|---|---|---|---|---|
| 8 | 2100 | 3,000 | — | 5.5 (no special handling) |
| 9 | 2100 | 5,000 | — | 6.0 (the powder was pretreated in HCL before plating) |
| 10 | 2100 | 15,000 | — | 6.5 (an alcohol rinse was applied after plating) |
| 11 | 2100 | 18,000 | — | 6.5 (no special handling) |
| 12 | 2100 | 12,000 | — | 6.4 (an alcohol rinse was applied after plating) |

An investigation was made as to whether fine particles, simply copper coated, would provide an improvement. The copper coating was again applied electrolytically utilizing a copper nitrite ($CuNo_3$) salt, the powder particles were restricted to −100 mesh.

| Sample No. | Sintering Temp. (° F) | Transverse Rupture Strength (psi) | Hardness ($R_B$) | As-Sintered Density |
|---|---|---|---|---|
| 13 | 2100 | 72,000 | — | 6.2 |

Finally, the combined affect of (a) cold working through a ball milling operation and (b) the application of a copper envelope or coating on each of the particles at the same time the ball milling is carried out, was investigated. It is important to point out that the copper coating was applied mechanically by an abrading action between copper balls and the cryogenic powder within the milling machine. Fine particles below 120 mesh probably obtained a copper coating merely by abrading of the soft copper thereonto, while the coarser particles achieved a copper envelope much more by abrading action along with receiving cold work. The ball milling was carried out for a period of 96 hours. The results were as follows:

| Sample No. | Sintering Temp. (° F) | Transverse Rupture Strength (psi) | Hardness ($R_B$) | As-Sintered Density |
|---|---|---|---|---|
| 14 | 2100 | 90,000 | 84 | 6.7 |

By ball ball milling for extended periods of time or at an increased stress rate, a transverse rupture strength of at least 95,000 can be obtained. Accordingly, it is concluded that not only is the transverse rupture strength improved by the combination effect herein but such improvement is beyond that obtainable by utilizing conventional atomized powder under the same processing conditions but without cold work or copper coating. Typically, atomized powder will obtain at best a transverse rupture strength of 85,000 psi with a density of around 6.7 g./cc. when processed under the most favorable conditions known to the prior art. Accordingly, with the decrease in cost by use of scrap materials reduced to a powder cryogenically along with the improvement in physical characteristics herein, important advantages have been obtained.

Other conclusions which can be drawn from the above data include: (a) the general effect of cold working by ball milling increases the sinterability of the cryogenically produced powder, (b) decreasing the average particle size of the powder has little effect by itself on the final physical properties, (c) copper or iron coating, by itself, appears only to improve sinterability of fine powders, and (d) the combination of cold working and copper or iron coating by use of balls laden with copper or iron, increases the sintered strength 4-5 fold.

Turning now to FIGS. 2 and 3, there is illustrated comparative examples of an as-sintered shape. The sample in the left hand portion of FIGS. 2 and 3 represents a shape produced in accordance with this invention utilizing cryogenically produced powder and processed with a second ball milling operation where cold working and copper coating is obtained. The sample in the right hand portion in each of the photographs represents an as-sintered shape obtained by conventional powder metallurgy techniques utilizing ordinary atomized iron powder. Such ordinary atomized powder typically consists of primarily 99.1% iron, the remainder may consist of: carbon 0.01-0.045%; silicon 0.005-0.015%; sulphur 0.004-0.016; phosphorous 0.007-0.027; Mn 0.04-0.26%; residual oxides — weight loss in $H_2$ is 0.2%-0.6%. The atomized powder was merely subjected to a compacting step achieving a green density of about 6.4, and was subjected to heating at a sintering temperature of 2050° F.

In FIG. 2, the right hand sample of this invention has a particularly evident smooth outer surface as opposed to the relative rough heterogeneously shaded outer surface for the sample on the left. FIG. 3 shows the end face where fracture took place as a result of destructive testing. The sample on the left has a typical fracture, rough and highly porous surface. The sample on the right has a fibrous appearance. The as-sintered shape of this invention is particularly comprised of ferrous particles which are randomly irregular in configuration, none of which are spherical; the particles are bound together by molecular diffusion at contact points therebetween, said shape having no apparent porosity and has a fractured surface as a result of destructive testing which appears as glassy. It is further characterized by a weight to volume ratio of 6.6-6.7, a typical transverse rupture strength of 95,000 psi with the compact at a density of 6.6-6.7 g./cc. (resulting from compression forces of 25-30 tsi). The hardness of such as-sintered shape is at least 84 $R_B$.

A new powder compact has been achieved as a result of practicing a portion of the disclosure herein. Such powder compact uniquely consists essentially of uniformly and homogeneously mixed ferrous based particles having a proportion of fine particles in the size range of +200-325 and a coarse particle proportion in the size range of +60-140, the fine particles being present in the ratio of 1:1 to the coarse particles, the fine and coarse particles each have a copper envelope about substantially each of the coarse particles thereof, and substantially each of the coarse particles have at least one defect site therein, said compact having a density of at least 6.6 g./cc. and a volume shrinkage of about 10% upon being heated to 2050° F.

Additional Sintering Test Data

The problem of prevention of oxidation of alloying elements dissolved in the iron powder is a kinetic one involving diffusion through the coating material to the particle surface. If diffusion is slow, chemical potentials of the metallics can be kept low enough at the outer surface of the coated particle, where oxygen potentials are the highest, to avoid oxidation. For the times and temperatures involved in formation of initial sinter bonds this is probably the case; at least for most substitutional elements soluble in iron. However, the fact that the diffusion process, as well as the process of solution of the coating material, is going on continuously during sintering implies that oxidation will occur to some extent after formation of the initial sinter bonds. However, once these bonds are formed they can continue to grow independently of the state of oxidation of the free particle surfaces. Further oxidation, therefore, is important only if subsequent operations require that inner pore surfaces be oxide free.

Figure 5:
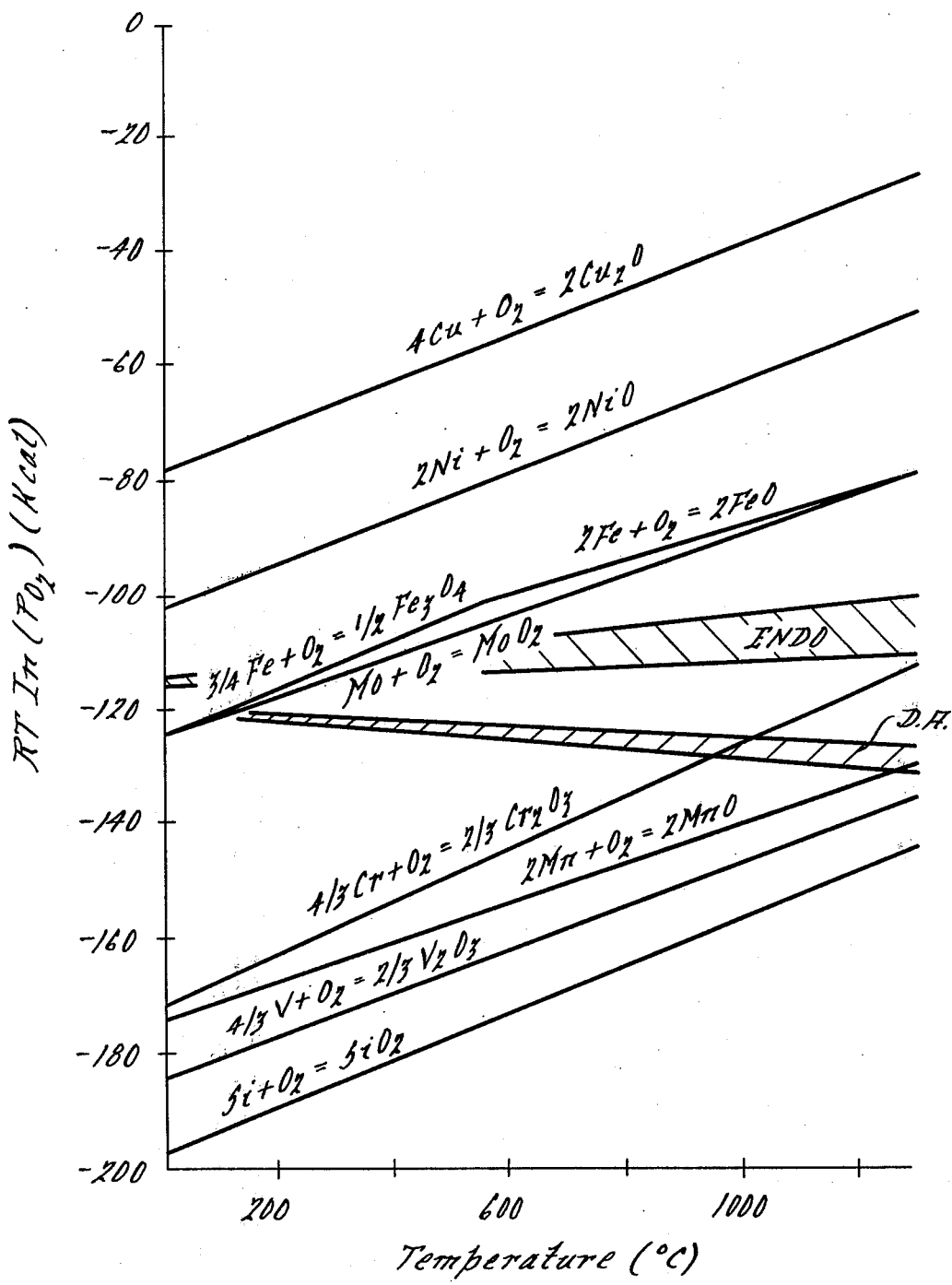
FIG. 5 is a graphical illustration of metal-oxide equilibria.

Selection of a coating that will not oxidize in endothermic gas atmospheres, or at least not have a stable form at sintering temperatures, may be made from equilibrium thermodynamic data for metal-oxide reactions. The Diagram shown in FIG. 5 is a plot of this type of data for metals of interest here. With the natural logarithm of the equilibrium oxygen pressure of the atmosphere gas plotted versus temperature, each of the equilibrium lines shown describes the temperature and oxygen pressure conditions required to cause dissociation of the metal oxide into metal + oxygen gas. Thus atmospheres with greater oxygen pressures or potentials than the dissociation pressure of an oxide lie above the equilibrium line and are in the region of oxide stability. Atmospheres with oxygen pressures less than the dissociation pressure lie below the equilibrium line and favor reduction of the oxide to pure metal. The cross-hatched areas shown in FIG. 5 represent the operational ranges of endothermic gas generators and dissociated ammonia atmospheres.

Note that the data shown here indicates why the common alloying elements in steel, other than copper, nickel and molybdenum, are not particularly well suited for iron sintering furnace atmospheres. Because of this the choice of coating materials from the elements shown reduces to copper, nickel, molybdenum or iron itself. Copper was chosen for initial trials because of the variety of coating methods available, both chemical and mechanical. Since copper melts at 1083° C. (1981° F.), it offers the additional advantages of being liquid at sintering temperatures and thus potentially promoting the rate of sintering via the action of capillary forces.

A number of additional powders were examined. Some of these powders, their nominal chemistry and screen analyses, are listed in Table I. The first three powders originated from steel machining swarf and the fourth from cast iron machining swarf. The steels, SAE 1050 (Cryo 314, Cryo 319) and 8620, (Cryo 138) were comminuted at cryogenic temperatures to avoid excessive plastic deformation. This was accomplished after preliminary cleaning and shredding by immersion in liquid nitrogen followed by hammer milling, a process subjecting the chips to high impact loads at temperatures below their ductile-to-ductile fracture transition. The combination of high impact loading and low temperature seemed to reduce the powder shape characteristics associated with mechanical comminution of ductile materials considerably. These materials, after comminution, were given a decarburizing anneal to reduce carbon levels below 0.1% by weight.

The 314 powder, supposedly from the same scrap source as the 319, illustrates a problem which must be contended with in dealing with the processing of scrap of this sort. The combination of abnormally high carbon and silicon of the 314, compared to the 319, suggested that the apparently "segregated" scrap did contain some cast iron swarf also. Thus, after decarburization, the 314 and 319 differed inadvertently in silicon concentration as well as in the intended particle size distribution.

The cast iron swarf powder (Iron 139) was comminuted by ordinary grinding procedures since it was inherently brittle. It was used in the ferritized condition to enhance compressibility properties. Some silicon carbide was noted in the powder; probably carried over from the grinding operation. The cast iron powder was not given a decarburizing anneal. Decarburization was accomplished during sintering by additions of $Fe_2O_3$ powder to the powder mix.

All powders were coated for varying lengths of time to determine the effect of thickness and continuity of the coating on the sintered properties. Once coated, processing of the coated powders was the same as for uncoated powders. Powders were blended with 1% zinc stearate and sufficient graphite to achieve a final combined carbon concentration of 0.6–0.8%. In the case of the cast iron, the stoichiometric amount of iron oxide required to reduce carbon to this level was substituted for the graphite. Powders were compacted into M.P.I.F. transverse rupture bars or tensile bars. Pressures used were kept constant at 414 MPa (30 tsi) and green densities were recorded as a measure of compressibility. Sintering was accomplished in endothermic gas atmospheres using a thermal cycle of 30 minutes at 788° C. (1450° F.) for burnoff of lubricant and 20 minutes at 1121° C. (2050° F.) for sintering, followed by a controlled cool to room temperature.

The sintered transverse rupture strengths (T.R.S.) of each powder were used as measures of the "quality" of sintering. The problems associated with the oxidation of silicon, manganese, and other alloying elements are reflected in significantly lower strengths than normally obtained with commercial iron powder mixes. As a reference, an iron — 0.7% carbon sintered alloy at a density of 6.7 g./cc. will have a T.R.S. of the order of 550 MPa (80 ksi), while the same alloy with 1.5% copper, admixed can attain a T.R.S. of 786 MPa (110 ksi).

Most of the initial test work was performed on Cryo 138 because of its high alloy concentration and because a plentiful supply of comminuted powder was available. These results are summarized in Table II. The first five entries represent attempts at sintering without prior coating. The data demonstrates the difficulty encountered in attaining acceptable property levels with ordinary wrought steel chemistry. The best situation, sintering at 1150° C. for 40 minutes in dissociated ammonia produces transverse rupture strengths only 73% of that possible with commercial iron powder at lower sintering temperatures and shorter times. The coated samples on the other hand, all possessed significantly higher transverse rupture strengths after sintering. The data presented for coated samples in Table II describes only the effects of coating variables. The code indicated in the table has coating treatment indicated by the letter prefix and coating time or thickness by the number. With the exception of the B treatment, the values selected for the table were optimum treatments for highest strength. Although it is not evident from the sintered densities shown, the B4 sample differed from the B3 in the amount of shrinkage which occurred during sintering; the B4 having shrunk significantly more.

The marked effect of coating was observed to be highly reproducible and relatively independent of the nature of the starting material itself. The coating treatment variations examined were primarily designed to vary the rate of copper plating and the adherence of the coating. From the data in Table II it is evident that B4, C2, and D5 treatments all provide properties equivalent to or better than the best commercial iron powder with 1.5% copper admixed. Copper analysis of the Cryo-138 powder indicates about 1% Cu present in samples with the thicker coatings.

Table III contains the data obtained from powder produced from essentially a plain carbon steel swarf. Cryo-314 is the finest particle size distribution examined from this material, Cryo 319, the coarsest. Once again the effect of coating is quite marked although the properties are not as high as for the Cryo-138. The Cryo-314 is, however, within the range of commercial iron powders without copper additions. The Cryo-319 is obviously too coarse and thus has too few inter-particle contacts to provide adequate strength. The contacts existing did, however, sinter satisfactorily as indicated by the data. The abnormally high silicon in Cryo-314 did not appear to have influenced the sintering process.

Table IV lists the results obtained from Iron 139 coating experiments. The coating procedure not only improved the sintered strength but increased the sintered density also. With green densities in all of these materials of the order of 5.0 g./cc., the large shrinkage during sintering is probably associated primarily with the high concentration of "fines" in the comminuted scrap. The coating schedule A4a represents the same coating conditions as A4 except that $Fe_2O_3$ was not added to the initial powder mixture for A4a samples. The higher combined carbon appears to have been responsible for the lower density.

Finally, the results obtained from coated and uncoated commercial iron powders, atomized and sponge, are shown in Table V. With no alloying elements present to cause oxidation problems during sintering, no effect would be expected. The unusual results obtained prompted examination of tensile properties as well. These too are shown in Table V. A definite improvement, albeit small compared to the mechanically comminuted powders, is present in both transverse rupture and tensile strengths for atomized iron. Sponge iron, however, shows a definite deterioration of transverse strength and little or no effect on tensile strength comparing coated to uncoated forms. The coating treatments were short time or thin coatings, to be sure, and coatings may not have been continuous but the dramatic difference in effect between atomized and sponge is real. Other atomized powders and regularly shaped powders, like carbonyl iron, were coated and sintered also with similar results i.e., a small but perceptible effect on sintered properties.

Carbon Embrittlement

A hypoeutectoid steel or hypoeutectoid alloy steel which is normally ductile can also be made brittle by heat treatment according to this invention. This method comprises (1) selecting ferrous scrap pieces with a carbon content in the range of 0.0–0.6%C.; (2) heating the selected ferrous based scrap pieces 25 to a temperature where all carbon is put into solution, such as in furnace 30; (3) subjecting the pieces 25 to a quench, such as in tank 29, severe enough to form pieces 26 having the martensite phase, (4) continuously impacting the heated treated pieces to form a powder 27, such as in a ball mill 28; and (5) preferably heat treating the powder for decarburization and softening so that it may be more readily adaptable to all present powder metallurgy techniques. If the powder is coated with a material through which carbon is readily diffused (such as purer iron) the decarburizing treatment may be carried out after the coating is applied. If a copper coating impervious to carbon is employed, decarburization should be provided before the coating is applied. The brittleness or martensite can be attributed to the distortional effect of carbon atoms in the martensite crystal lattice. The greater the supersaturation of carbon the higher the distortion and thus the more highly stressed the material becomes. Hardness data on as quenched martensite indicate that at about 0.6% by weight, of carbon, the distortional effect of carbon atoms begins to abate, but continues to a lesser extent as carbon is increased.

The employment of such an embrittling heat treatment to allow comminution of ductile machine chips into powder is unique. The process as described above would be practical if the chips could be quenched rapidly and to a low enough temperature to form 100% martensite. Unfortunately, with the low carbon concentrations normally employed in machining steels, this is not usually practical. Thus the heat treatment sequence requires formation of martensite and may involve additional or alternative carburization (2b) during the carbon solution treatment. This enables a less severe quenching schedule to be employed and still from martensite in appreciable proportions. The most desirable quench would be one that produces a completely martensitic microstructure with carbon concentrations in excess of 0.6%, the most brittle structure possible since little or no plastic deformation can be introduced before fracture occurs. However, sufficient embrittlement for the purposes of comminution can be obtained with lesser fractions of martensite with the tradeoff coming in energy expended for comminution. The more ductile components in the microstructure, the greater the proportion of the energy input is consumed by plastic deformation rather than comminution. Optimization of the process is directly related to the specific composition of the steel chips.

The effectiveness of the embrittlement process was tested by degreasing and heating a batch of machining chips for 2 hours at 1000° C. in a carburizing atmosphere. The original composition of the chips was typically SAE 8617 as shown in Table II; also listed is the composition for the same material that was carburized. Because 8617 steel is highly alloyed, quenching was not necessary to form martensite with 1% carbon present, only a rapid cool. The cooling was carried out in a furnace under atmosphere to avoid decarburization upon cooling. The same procedure would have to be followed if a quench was employed, i.e. maintaining the chips under atmosphere until they are immersed completely in the quench medium. The heat treated chips were then subjected to one pass through a hammer mill and reduced to a size distribution as follows:

| Mesh size | Fraction |
|---|---|
| +30 | 50% |
| −30/+60 | 20% |
| −60/+100 | 12% |
| −100/+140 | 7% |

-continued

| Mesh size | Fraction |
|---|---|
| −140/+200 | 7% |
| −200/+325 | 3% |
| −325 | 1% |

Similar chips, in the untreated condition, would not pass through the hammer mill without destroying the internal screens due to their ductility and toughness in the as-received condition.

Subsequent grinding to reduce average particle size was performed in a ball mill, using only the −30 mesh particles. Using a 4 inch diameter × 4 inch length alumina ball mill charged with 158 grams of chips, 2730 grams of ⅜ inch–¼ inch diameter iron balls and 350 cc. of reagent grade benzene, a grinding period of about 160 hours produced 225 grams of coated powder more than 98% of the product having a screen analysis of −325 mesh. In previous experimental work, with untreated chips of the same alloy, complete elimination of the +60 fraction was never achieved with comparable milling times (see Table III). Although the grinding experiment performed on the embrittled powder resulted in a product that was too fine for commercial application it did establish two facts:

(1) The embrittling heat treatment makes hammer milling of the machining chips possible and markedly improves grinding efficiency in the ball mill grinding;

(2) Simultaneous grinding and iron coating is possible. Final chemical analysis of the ball mill product revealed about a 10 weight % pickup of iron, as coating.

Figure 6A:
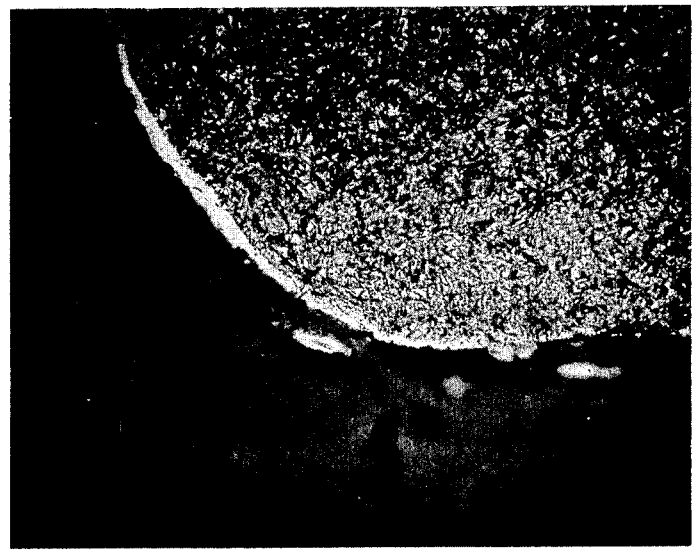
FIGS. 6a and 6b are photgraphs, different magnifications, of a powder specimen processed according to FIG. 4.
Figure 6B:
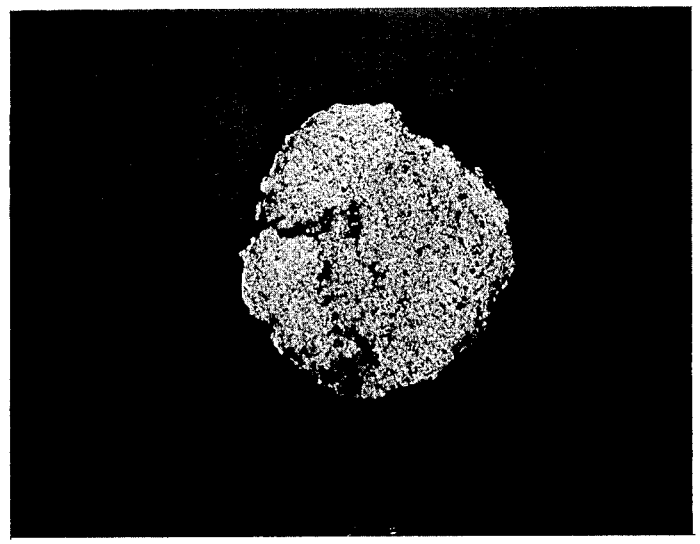

Subsequent experiments have established that shorter grinding times will produce coaser products more in line with commercial requirements and have indicated that a continuous ball milling operation where the −100 mesh product is swept away continuously by overflow of the milling liquid is the most practical way of achieving the most desirable product. The particle product is illustrated in FIGS. 6a and 6b for different particles (at 500X and 100X, respectively). The light outer rim is the anti-oxidation envelope and appears best in FIG. 6a.

One Step or Continuous Embrittlement (1) Scrap metal is selected to have the proper size and desirable chemistry as outlined in the preferred embodiment. Other types or larger pieces of scrap metal can be used, but capital investment costs will increase due to the difficulty of impacting scrap metal sized in pieces beyond 0.03 inches thick. The scrap pieces should be selected to be generally compatable in chemistry as desired in the final product; this is achieved optimally when the scrap is selected from a common machining operation where the same metal stock was utilized in forming the turnings.

(2) Although not critically necessary, it is preferable to degrease the ferrous based pieces by conventional modes which may include vapor degreasing or dipping the pieces in a solvent bath usually containing benzene or methyl-ethyl-keytone. However, with the type of cryogenic processing taught herein, it is now possible to remove oil and other organic materials without any separate cleaning. This occurs as a result of allowing the organic material to freeze upon being subjected to cryogenic temperature levels. The frozen material can then be removed during or after impaction by ball milling elements; the frozen organic debris can be screened and separated as an inherent result of this process.

Figure 7:
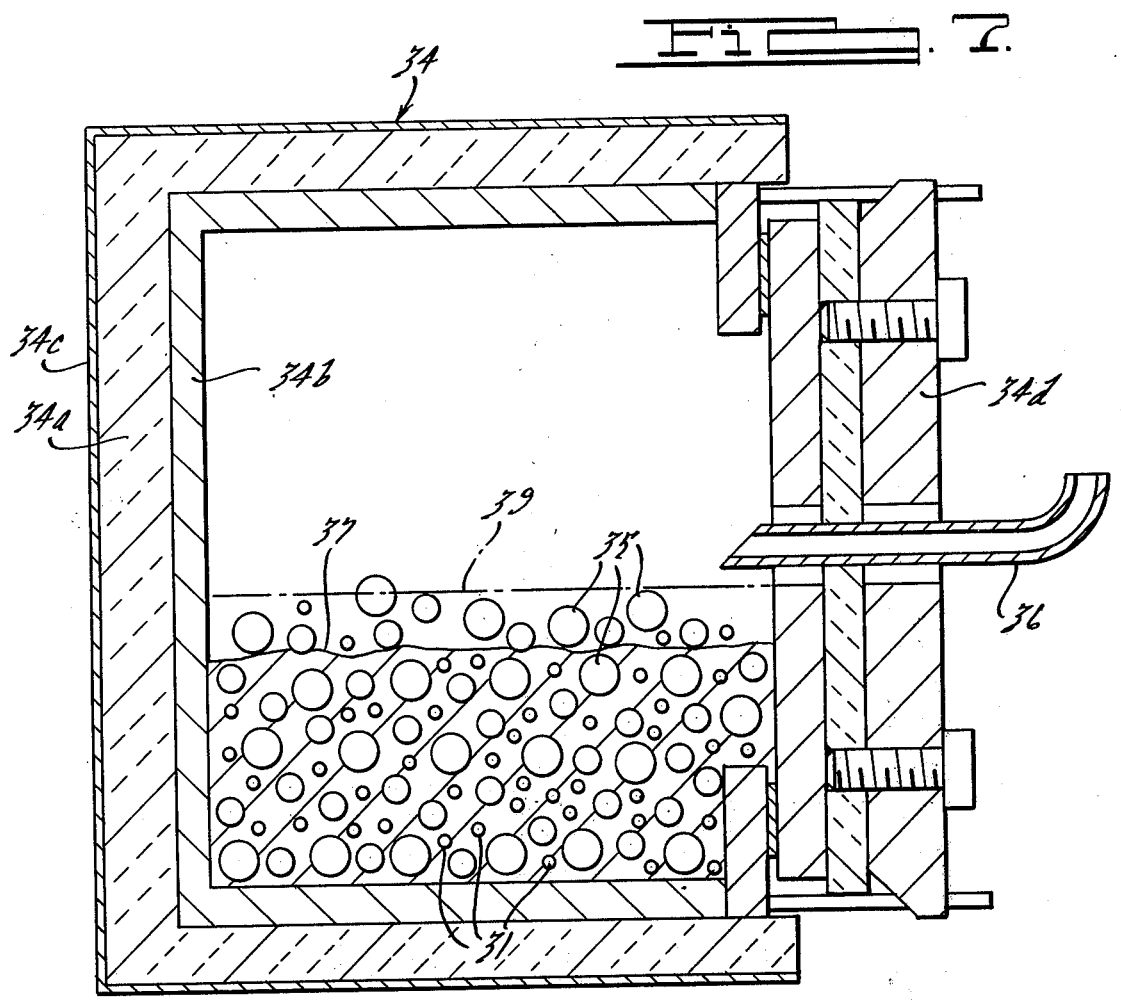
FIG. 7 is a central elevational sectional view of one type of batch apparatus suitable for use in carrying out the process of this invention.
Figure 8:
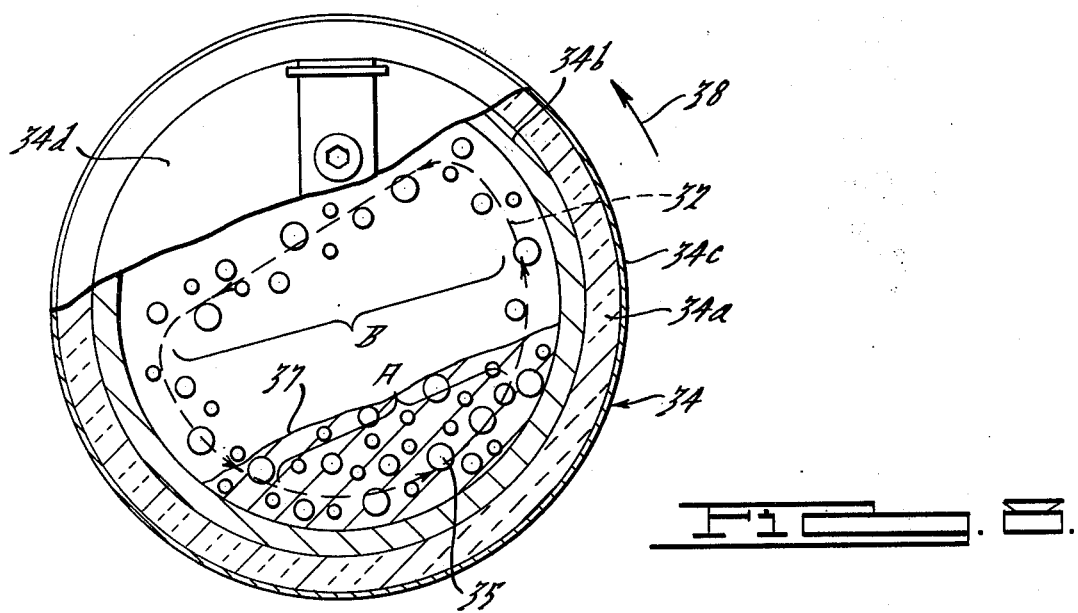
FIG. 8 is an end elevational view of the apparatus of FIG. 7, shown partly broken away.

(3) A circulating mass of said ferrous based pieces 31 in a predetermined path 33 is defined. This is conveniently provided by introducing the scrap pieces to a ball milling drum 34 having an insulating body 34a encased between metal walls 34b and 34c, as specifically shown in FIG. 7. The scrap pieces (here shown as comminuted in FIG. 7) and milling elements 35 are loaded into the drum 34 prior to closure of cover 34d; liquid nitrogen is added later through conduit 36. The circulating mass is stimulated by the rotary movement (such as in direction 38) of the drum of the ball milling machine 34. The circulatory path 32 can be selected by the uniform or non-uniform rotary speed of the drum. Liquid nitrogen is introduced to the drum in a predetermined quantity to provide a liquid level 37 slightly below the top surface 39 of the slurry created by the composite of the pieces and liquid nitrogen. As the drum is rotated at a predetermined speed, the liquid nitrogen will be generally retained in a zone A, often assuming a crescent shape silhouette as shown in FIG. 8. The ferrous based scrap pieces will be influenced somewhat differently and will undergo a circulatory movement as indicated in path 32 which rises above the liquid nitrogen in zone B. Thus, for a portion of the circulation along path 32, the ferrous spaced pieces will not be exposed to the liquid nitrogen. As a result of both the heating (experienced by collision between the ferrous based pieces and the ball milling elements 35 causing a release of energy and the divorce from the liquid nitrogen, the ferrous based particles will experience an increase in temperature in zone B such that they will be momentarily above the ductile-brittle transition temperature of the particles. Upon return to zone A, of course, the ferrous based particles will again be contacted by liquid nitrogen to be reduced below the ductile-brittle transition temperature.

(4) Impaction of said ferrous based pieces or particles is inherently carried out by the circulatory movement which collides one particle against the other. For the purposes of fragmenting the pieces at the sub-brittle temperatures, milling elements 35 are employed in the form of balls having a diameter of about 0.5 inches. Cylindrical rods or segments can also be employed. Such balls are preferably constituted of copper or iron, or any other equivalent protective metal which has a melting temperature below, but substantially close to the liquidus of said ferrous based particles, said protective metal being completely soluble in the material of which said particles are constituted and said protective metal is relatively easy to abrade and can be abraded at the sub-brittle temperatures of this method. Thus, in zone A, the impacting elements, preferably in the form of copper balls, will impart a fracturing force to the particles causing them to separate into a classifiable comminuted condition. At the same time, each of the fragmented particles will receive an infinitesimal portion of the copper ball upon each collision, which when multiplied by a large number of repeated collisions will form a partial envelope or layer on the outer surface of each particle. Upon the occurrence of a predetermined number of circulatory revolutions, it has been determined that a complete copper envelope or protective metal envelope is formed upon each particle. The time necessary to achieve such complete envelope in a function of milling time and rate which in turn is dependent upon mill volume, mill diameter, size of copper balls, and the speed of drum rotation.

Iron is brittle at a temperature below-40° Celsius and copper is not. Accordingly, the ferrous based machine turnings, introduced into the batch ball milling machine, will be impacted by elements not brittle at such temperature. A temperature of-40° Celsius or less is achieved by introducing the liquid nitrogen through said feed conduit 36 extending through one end, such as the cover 34d, and substantially coincident with the axis of rotation. Liquified nitrogen is employed, although other mediums which may be used include dry ice with acetone or other organic liquids. A vent is provided in one location of the milling chamber to exhaust gaseous nitrogen as it evaporates.

In zone B of the circulatory movement, the ball milling elements will impart sufficient cold work to the comminuted particles to generate defect sites in substantially all particles of about 1–4 microns; the ball milling operation herein should be carried out for a sufficient time so that substantially each coarse particle has at least one defect site therein.

When these steps are completed, the particles (in powder form) are separated from the slurry, the resulting powder will have all particles coated with a continuous copper envelope (shell) and each particle (1–4 microns) will be sufficiently stressed so as to have a high degree of compactability. The term "defect site" is defined herein to mean a defect in local atomic arrangement. The term "copper shell" is defined herein to mean a substantially continuous thin envelope intimately formed on the surface of the particle. Although the shell should preferably be impervious and continuous about each particle, it is not critical and that it be absolutely impervious.

It has been demonstrated by test examples, performed in connection with reducing this invention to practice, that cold working of the particles predominantly influences diffusion kinetics when sintering powder of this invention, the copper coating or shell operating to predominantly perform an anti-oxidation barrier during sintering of the powder herein.

(5) The intermediate or resulting product from the above steps can then be subjected to powder metallurgy techniques. A predetermined quantity of conditioned powder is compacted by a conventional press to a predetermined density, such as preferably 6.6 g./cc. This is brought about by the application of forces in the range of 30–35 psi. The presence of the copper envelope about the powder particles improves compressability. With prior uncoated powders, a density of about 6.4 g./cc. is typically obtained using a compressive force of 85,000 psi; with the powder herein, densities of about 6.6 g./cc. are now obtained at the same force level.

The shape into which such powder is compacted should have an outer configuration slightly larger than that desired for the final part. A significant and highly improved shrinkage takes place as the result of the sintering step. The shrinkage is a predetermined factor and allowance can be made for it in the compacted shape. Shrinkage will be in the controlled limits of ±0.002 inches/inch.

(6) The compacted shape is subjected to a sintering treatment within a furnace wherein it is heated to a temperature preferably in the range of 2000°–2100° F. for ferrous based cryogenic powder. The temperature to which each compact is heated should be at least to the plastic or sintering region for the metal constituting the powder. A controlled or protective atmosphere is maintained in the furnace, which may be inert or reducing.

At the sintering temperature, atomic diffusion takes place between particles of the powder, particularly at solid contact points. Certain atoms of one particle are supplied to fill the defect sites (absence of certain atoms in the crystal structure of the contacted particle) said defect sites being present as a result of cold working. Diffusion is accelerated to such an extent, that an increase of more than 100 times is obtained. It is theorized that at least 60% of the improvement in physical properties of the resulting sintered shape is due to the controlled cold working of the powder. The increased diffusion is responsible for the increase in shrinkage.

Figure 9:
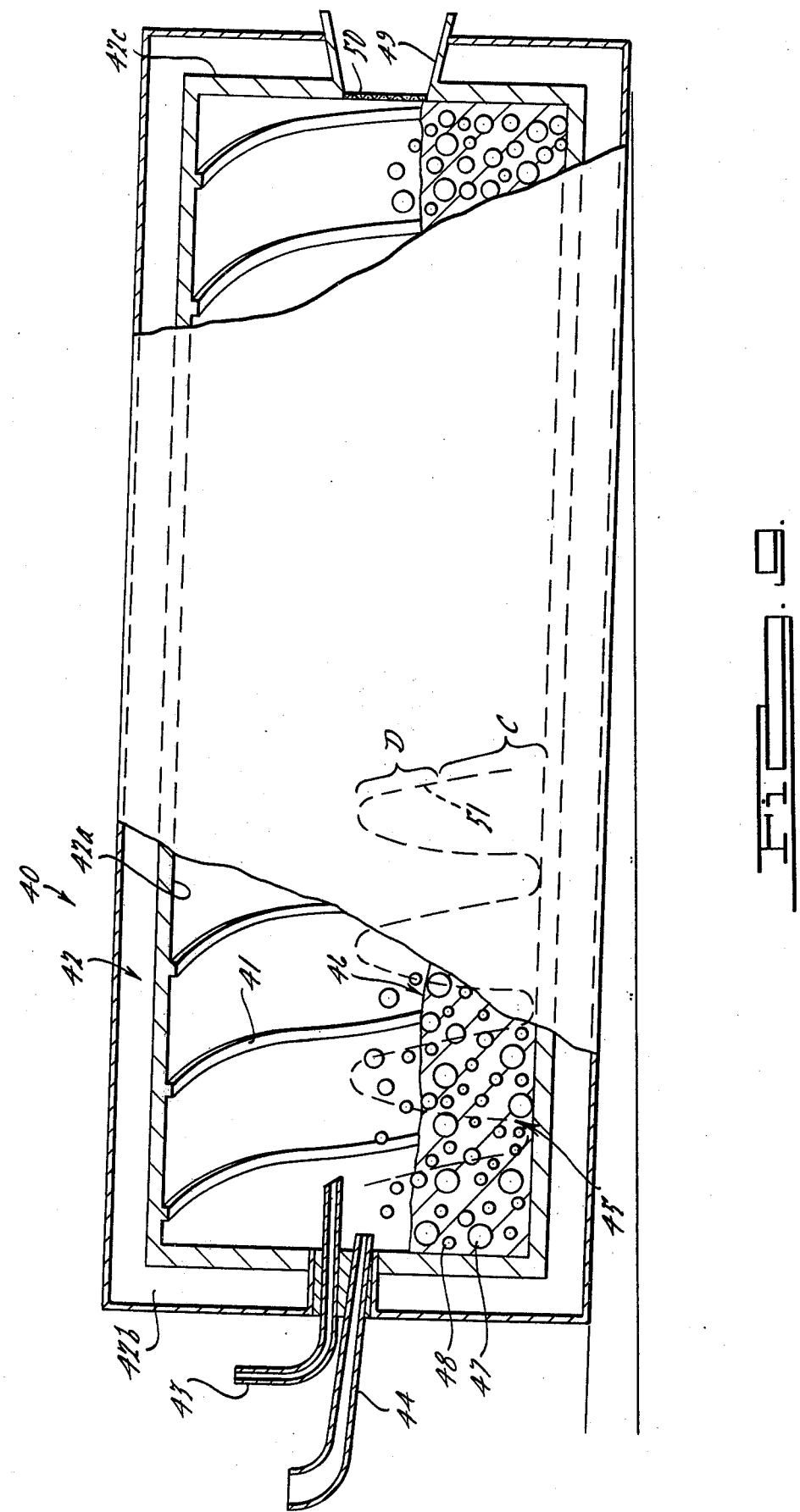
FIG. 9 is a central elevational sectional view of an alternative apparatus useful in providing a continuous process for the method of this invention shown partly broken away.

The process of this invention can be carried out continuously, such as by an apparatus shown in FIG. 9. The cylindrical apparatus 40 has rifling or ribs 41 spirally located about the interior 42a of the continuous processing drum 42. Liquid nitrogen is introduced at one end 42b of the drum through a conduit 43 preferably aligned with the axis of the drum. Another conduit 44 is also arranged along the axis to introduce scrap material in the form of machine turnings or comparable ferrous scrap material. The drum is inclined at an angle to the horizontal preferably in the range of 1° to 2° so that the slurry 45 comprised of liquid nitrogen 46, ball milling elements 47 and the ferrous scrap material 48 will undergo a transcillatory as well as a rotary movement along the length of the drum 42 and about the diametrical interior of the drum. At the opposite and 42c of the processing drum, an exit opening 49 is provided which is covered by a sieve 50 effective to allow exit of processed particles only of a certain size which rise to the surface of the slurry mixture. Here again, the ferrous particles will undergo a circulatory movement along a path 51 which includes a zone C when the particles are immersed in the liquid nitrogen (with their temperature below the ductile-brittle transition point) and a zone D when the particles are lifted momentarily out of the slurry as a result of the rotary action. During this momentary exposure, the ferrous based particles will experience an increase in temperature to above the ductile-brittle transition temperature (but below ambient temperature conditions) to permit imparting cold work to the particles. The exit opening 49 permits discharge of gasified nitrogen as well as a small portion of the liquid nitrogen. It has been found that regulation of the opening shape between wires of the screen is important as well as the mesh size of the screen. To this end, −30 mesh has been found preferably to achieve a type of powder which has optimum sinterability and compaction characteristics. The sieve opening shape should be preferably square shaped.

TABLE I
A. Nominal Chemical Analyses (weight percent)

| Powder | C | Mn | Si | P | S | Ni | Cr | Mo | Cu |
|---|---|---|---|---|---|---|---|---|---|
| Cryo 138 | 0.20 | 0.42 | 0.33 | 0.03 | 0.03 | 0.44 | 0.58 | 0.14 | 0.26 |
| Cryo 314 | 1.12 | 0.74 | 0.86 | 0.02 | 0.01 | 0.01 | 0.03 | 0.05 | 0.04 |
| Cryo 319 | 0.53 | 0.80 | 0.25 | 0.02 | 0.02 | 0.01 | 0.03 | 0.05 | 0.01 |
| Iron 139 | 1.57 | 0.62 | 2.30 | 0.03 | 0.15 | 0.03 | 0.04 | 0.05 | 0.31 |
| Sponge | 0.11 | 0.74 | 0.86 | 0.01 | 0.01 | — | 0.03 | 0.04 | 0.04 |
| Atomized | 0.01 | 0.27 | 0.04 | 0.01 | 0.03 | 0.04 | 0.04 | 0.04 | 0.14 |

TABLE I-continued
B. Sieve Analyses (weight percent)

| Powder | +60 | +100 | +140 | +200 | +325 | −325 |
|---|---|---|---|---|---|---|
| Cryo 138 | 60.5 | 17.0 | 6.4 | 7.2 | 5.0 | 5.0 |
| Cryo 314 | 59.0 | 17.3 | 10.2 | 8.6 | 4.4 | 0.6 |
| Cryo 319 | 80.4 | 10.6 | 4.0 | 4.5 | 0.5 | — |
| Iron 139 | — | 26.8 | 31.1 | 21.5 | 14.6 | 6.0 |
| Sponge | — | 6.2 | 25.5 | 39.2 | 21.0 | 8.1 |
| Atomized | — | 7.3 | 27.0 | 37.4 | 20.4 | 7.9 |

TABLE II:
CRYO 138 RESULTS

| Type Coating | Time (min.) | Temp. (°C) | Atm. | Final Density (g/cc) | T.R.S. (MPa) |
|---|---|---|---|---|---|
| No Coating | 40 | 1150 | D.A.* | 6.9 | 399.2 |
| No Coating | 20 | 1121 | Endo** | 6.8 | 121.4 |
| No Coating | 20 | 1121 | Endo** | 6.5 | 113.8 |
| No Coating | 20 | 1135 | Endo** | 6.5 | 141.3 |
| No Coating | 20 | 1149 | Endo** | 6.6 | 151.7 |
| A4 | 20 | 1121 | Endo** | 6.7 | 648.1 |
| B3 | 20 | 1121 | Endo** | 6.5 | 655.0 |
| B4 | 20 | 1121 | Endo** | 6.4 | 931.8 |
| C2 | 20 | 1121 | Endo** | 6.8 | 742.3 |
| D5 | 20 | 1121 | Endo** | 6.4 | 813.6 |

*Dissociated Ammonia
**Endothermic Generator Gas (Dew Point = 7° C)

TABLE III:
CRYO 314 and CYRO 319 RESULTS
Sintered 20 min. at 1121° C in Endothermic Gas (Dew Point 7° C)

| | Coating | Final Density (g/cc) | Trans. Rupture Strength (MPa) |
|---|---|---|---|
| 314 | None | 6.8 | 144.8 |
| | D2 | 6.7 | 586.1 |
| 319 | None | 6.7 | 17.2 |
| | D2 | 6.5 | 103.4 |

TABLE IV:
IRON 139 RESULTS
Sintered 20 min. at 1121° C in Endothermic Gas (Dew Point 7° C)

| Coating | Final Density (g/cc) | Trans. Rupture Strength (MPa) |
|---|---|---|
| None | 4.7 | 50.3 |
| A3 | 5.8 | 562.7 |
| A4 | 6.5 | 666.7 |
| A4a | 6.3 | 647.4 |

TABLE V
ATOMIZED AND SPONGE IRON RESULTS
Sintered 20 min. at 1121° C in Endothermic Gas (Dew Point 7° F)

| | Coating | Density (g/cc) | Trans. Rupture Strength (MPa) | Tensile Strength (MPa) |
|---|---|---|---|---|
| Atomized | None | 6.6 | 557.8 | 248.2 |
| | D1 | 6.4 | 587.4 | 303.4 |
| Sponge | None | 6.3 | 724.0 | 243.4 |
| | D1 | 6.2 | 558.5 | 262.0 |

TABLE VI:
CHEMICAL ANALYSES OF 8617 CHIPS

| | C | Mn | P | S | Si | Cu | Ni | Mo | Cr |
|---|---|---|---|---|---|---|---|---|---|
| As Rec'd | 0.20 | 0.76 | 0.008 | 0.026 | 0.33 | 0.20 | 0.44 | 0.20 | 0.65 |
| Heat Treat- | 1.14 | " | " | " | " | " | " | " | " |

TABLE VI:-continued

CHEMICAL ANALYSES OF 8617 CHIPS

| | C | Mn | P | S | Si | Cu | Ni | Mo | Cr |
|---|---|---|---|---|---|---|---|---|---|
| ed | | | | | | | | | |

TABLE VII:

SCREEN ANALYSIS OF LOW CARBON 8617 POWDER

Untreated Chips

| Milling Time | +60 | −60/+100 | −100/+200 | −200/+325 | −325 |
|---|---|---|---|---|---|
| As Rec'd (No Milling) | 59.8 | 16.8 | 12.4 | 4.9 | 4.9 |
| Milled 8 Hrs. | 44.2 | 18.0 | 19.3 | 8.2 | 10.3 |
| Milled 72 Hrs. | 31.5 | 11.0 | 25.5 | 22.5 | 9.5 |

I claim as my invention:

1. A method of making sintered shapes from ferrous-based metallic particles containing maganese and silicon, the latter having been cryogenically comminuted, the steps comprising:
   (a) repeatedly impacting a charge of said metallic particles with a plurality of elements laden with copper or iron, each of said elements having a transverse dimension at least 50 times the longest dimension of any of said particles, said impacting being continued to simultaneously coat substantially each of said particles with a thin copper or iron envelope and to cold-work each of said particles having a size above 120–124 microns,
   (b) compacting a predetermined quantity of said impacted particles into a desired shape, and
   (c) heating said shape in an endothermic gas atmosphere to at least the sintering temperature for said metal particles to permit atomic diffusion to take place between particles in adjacent contact within said shape, said copper or iron envelope above each of said particles prohibiting oxidation of the ingredients of said particles during said heating, and said cold-working promoting increased diffusion.

2. A method of making sintered shapes as in claim 1, in which said copper or iron laden elements comprise solid copper or iron spheres having a diameter of at least 0.1 inch.

3. The method of making a sintered shape as in claim 1, in which said charge of metallic particles is comprised of both coarse and fine particles, each of said particles having an irregular flake configuration prior to impaction, the fine particles constituting no more than 50% of said total particle volume, said fine particles being substantially devoid of cold-work after said impacting step while substantially each said coarse particles have cold-work strain.

4. The method of making sintered shapes as in claim 1, in which the metal particle charge is comprised of ferrous-based particles some of which contain manganese and/or silicon in solid solution above 0.1%, said thin copper or iron envelope about each of said particles operating to prevent oxidation of said manganese and silicon during said heating step.

5. A method of making sintered shapes as in claim 1, in which said impacting step is carried out with the use of a ball mill, the rate and frequency of contact between said metal particles and the elements of said ball mill being adjusted to achieve a rate of stress over a period of time to achieve said cold work in the particle sizes above 124 microns.

6. The method of making sintered shapes as in claim 1, in which said compaction step is carried out to produce a green density in said shape compact of at least 6.4 g./cc. by the use of 30 tsi.

7. The method of making sintered shapes as in claim 1, in which said shape has a first volume as a result of said compacting step and has a second volume as a result of said heating step, the difference between said first and second volumes being at least 10%.

8. A method of making sintered shapes as in claim 1, in which said charge of metal particles is comprised of randomly irregular ferrous particles each of which are non-spherical, said shape being heated to a sintering temperature of 2050° F. and held at said sintering temperature for a period of at least 20 minutes, whereby shrinkage between the cold compacted shape and said sintered shape is at least 7.0%.

9. A method of making an intermediate powder, comprising:
   (a) selecting metallic turnings having oxidizable ingredients and which have a surface-to-volume ratio of at least 60:1,
   (b) simultaneously refrigerate to below the ductile-brittle transition temperature of said turnings and impacting said turnings with a fracturing force, continuing said refrigeration and impaction for a period of time to comminute said turnings,
   (c) impacting said comminuted particles at ambient temperature conditions with an abrading force, said impacting being carried out by the use of elements laden with a protective metal protective against oxidation of ingredients soluble in the base metal of said turnings and having a hardness less than that of the coated powder to promote transfer of said protective metal to said particles upon impact between said elements and particles, said protective metal having a melting temperature below but substantially near the liquidus of said particles and being completely soluble in said metal of said particles, said protective metal being relatively easy to abrade, and
   (d) continuing to carry out the impaction of step (c) to provide both coating of said particles with a thin envelope of said protective metal and cold working of substantially each particle having a size greater than 124 microns to thereby promote at least one cold-work strain site therein.

10. The method of making an intermediate powder as in claim 9, in which the step of refrigeration is carried out by the use of liquid nitrogen, said impaction being carried out by the use of a ball mill having ball elements to impact with said particles.

11. The method of making an intermediate powder as in claim 10, in which said ball elements of said ball mill are comprised of solid copper.

12. A method of making a powder compact, comprising:
   (a) selecting metallic machine turnings comprised substantially of ferrous-based material, said turnings having a surface-to-volume ratio of at least 60:1,
   (b) simultaneously refrigerating and impacting said turnings to promote comminution of said metal turnings to a powder, (c) repeatedly impacting a charge of said powder with a plurality of copper or iron laden elements having a transverse dimension at least 50 times the largest dimension of any particles of said powder, said impacting being carried out at ambient temperature conditions to simultaneously coat substantially each of said particles with a thin copper or iron shell and to stress substantially each of said particles above 124 microns to effect cold-working therein and to deliberately establish at least one non-natural defect site in each of said particles above 124 microns, and (d) compacting a predetermined quantity of said copper or non-coated particles into a desired shape.

13. The method of making a compact as in claim 12, in which said copper laden elements consist of solid copper or iron balls having a diameter substantially about 0.5 inches, said copper balls operating within a revolving housing of a ball mill, said housing being rotated so as to impact said copper or iron balls with said comminuted particles at a predetermined rate and stress frequency so as to produce said copper or iron coated particles and defect sites therein.

14. A method of making sintered shapes from ferrous-based metallic particles containing oxidizable ingredients at conventional sintering temperatures and atmospheres, the latter having a substantially martensitic structure, the steps comprising:

(a) repeatedly impacting a charge of said metallic particles with a plurality of elements laden with copper or iron, each of said elements having a transverse dimension at least 50 times the longest dimension of any of said particles, said impacting being continued to simultaneously coat substantially each of said particles with a thin copper or iron envelope and to cold-work each of said particles having a size above 120–124 microns, (b) compacting a predetermined quantity of said impacted particles into a desired shape, and (c) heating said shape to at least the sintering temperature for said metal particles in an atmosphere at least non-oxidizing to said envelope to permit atomic diffusion to take place between particles in adjacent contact within said shape, said copper or iron envelope about each of said particles during said heating, and said cold working promoting increased diffusion of the ingredients of said particles.

15. A method of making sintered shapes as in claim 14, in which said copper or iron laden elements comprise solid copper or iron spheres having a diameter of at least 0.1 in.

16. The method of making a sintered shape as in claim 14, in which said charge of metallic particles is comprised of both coarse and fine particles, each of said particles having an irregular chip configuration prior to impaction, the fine particles constituting no more than 50% of said total particle volume, said fine particles being substantially devoid of cold work after said impacting step while substantially each of said coarse particles have cold work strain.

17. The method of making sintered shapes as in claim 14, in which the metal particle charge is comprised of ferrous based particles some of which contain at least one of manganese, silicon, chromium or vanadium, in solid solution, said thin copper or iron envelope about each of said particles operating to prevent oxidation of said manganese, silicon, chromium or vanadium during said heating step.

18. A method of making sintered shapes as in claim 14, in which said impacting step is carried out with the use of a ball mill, the rate and frequency of contact between said metal particles and the elements of said ball mill being adjusted to achieve a rate of stress over a period of time to achieve said cold work in the particle sizes above 124 microns.

19. The method of making sintered shapes as in claim 14, in which said shape has a first volume as a result of said compacting step and has a second volume as a result of said heating step, the difference between said first and second volumes being at least 10%.

20. A method of making sintered shapes as in claim 14, in which said change of metal particles is comprised of randomly irregular ferrous particles each of which are non-spherical, said shape being heated to a sintering temperature of 2050° F. and held at said sintering temperature for a period of at least 20 minutes, whereby shrinkage between the cold compacted shape and said sintered shape is at least 7.0%.

21. A method of making an intermediate powder, comprising:

(a) selecting metallic turnings containing oxidizable ingredients during sintering at conventional temperatures and atmospheres which have a surface-to-volume ratio of at least 60:1, (b) heating said turnings to a temperature at which all carbon in said turnings dissolve, said heating being carried out under an atmosphere and for a period of time effective to provide substantially a complete martensitic solidification structure at a selected cooling rate, (c) cooling said turnings at said selected rate, (d) impacting said heat treated turnings at ambient temperature conditions with a fragmenting force, said impacting being carried out by the use of elements laden with a metal protective against oxidizing of said ingredients and having a hardness less than that of the coated powder to promote transfer to said particles upon impact between said elements and particles, said protective metal being completely soluble in said metal of said particles and being relatively easy to abrade, and (e) continuing to carry out the impaction of step (d) to provide both coating of said particles with a thin envelope of said protective metal and cold working of substantially each particle having a size greater than 124 microns to thereby promote at least one cold work strain site therein.

22. The method of making an intermediate powder as in claim 21, in which the turnings are comprised of hypoeutectoid iron based metal having a carbon content less than 0.6%, and heating is carried out in a carburizing atmosphere to increase the carbon content of said turnings to at least 0.6%.

23. The method of making an intermediate powder as in claim 21, in which said impaction is carried out by a ball mill having ball elements comprised of solid copper or iron.

24. The method of making an intermediate powder as in claim 21, in which the carbon content of said untreated as well as treated turnings is between 0.09 and 0.6%, the cooling rate of step (b) being sufficiently rapid to quench said turnings and produce a solidification structure having at least 80% martensite.

25. A method of making a powder compact, comprising:
(a) selecting metallic machine turnings comprised substantially of ferrous based material, said turnings having a surface-to-volume ratio of at least 60:1 and a hypoeutectoid composition,
(b) heat treat said turnings to provide a martensitic structure therein of at least 80%,
(c) milling said heat treated turnings to provide chips of about −30 mesh,
(d) repeatedly impacting a charge of said milled chips with a plurality of copper or iron laden elements having a transverse dimension at least 50 times the largest dimension of any chip, said impacting being carried out at ambient temperature conditions to simultaneously coat substantially each of said particles with a thin copper or iron shell and to stress substantially each of said particles above 124 microns to effect cold working therein and to deliberately establish at least one non-natural defect site in each of said particles above 124 microns, and
(e) compacting a predetermined quantity of said copper or iron coated particles into a desired shape.

26. The method of making a compact as in claim 25, in which said copper laden elements consist of solid copper or iron balls having a diameter substantially about 0.5 inches, said copper balls operating within a revolving housing of a ball mill, said housing being rotated so as to impact said copper or iron balls with said comminuted particles at a predetermined rate and stress frequency so as to produce said copper or iron coated particles and defect sites therein.

27. A continuous method of improving the sinterability and compactability of ferrous based scrap converted to powder, the improvement comprising the steps of:
(a) circulating a charge of metallic scrap particles having a volume-to-surface ratio of at least 60:1 to form a circulating mass,
(b) embrittling said particles either prior to or during said circulation,
(c) either subsequent to or simultaneous with step (b), impacting said particles to fracture during one phase of said circulation and coating said fractured particles by impact-transfer with an oxidation protective metal having a melting temperature below but substantially near the liquidus of said particles and being completely soluble in the metal of said particles, said protective metal having a hardness less than the coated metal to provide for ease of abrasion.

28. The method as in claim 27, in which, during said one phase of circulation said particles are reduced in temperature to below the ductile-brittle transition temperature to provide embrittlement, and during said another phase of circulation of said ferrous particles, the particles are allowed to rise in temperature above the ductile-brittle temperature condition, the particles are additionally impacted to impart a controlled degree of cold work to the surface of each of said fragmented particles.

29. A continuous method of making an intermediate ferrous powder having improved sinterability and compactability, the process comprising:
(a) selecting metallic scrap particles in the form of turnings containing manganese and silicon, and which turnings have a surface-to-volume ratio of at least 60:1,
(b) circulating said metallic scrap particles while cooling said particles below the ductile-brittle transition temperature in at least one zone of said circulation and allowing said particles to rise in temperature above the ductile-brittle transition temperature but below ambient temperature conditions in another zone,
(c) impacting said particles by use of a fracturing force in said one zone of circulation to comminute said turnings and to impart a coating on said fractured pieces consisting of an oxidation protective metal having a melting temperature below but substantially near the liquidus of said pieces and being completely soluble in said metal of said pieces, said protective metal being abradable by said fracturing force,
(d) impacting said comminuted particles in said other zone to effect a controlled degree of cold work of the surface of substantially each comminuted particle, and
(e) separating said comminuted coated and cold worked particles from said circulating body.

30. The method as in claim 21, in which said impaction of step (c) is carried out by the use of cylindrical or spherical elements consisting essentially of said protective metal, said protective metal being of the type which is not brittle at temperatures at which said metallic particles are brittle.

31. The method as in claim 30, in which said impacting elements consist essentially of at least one of copper and iron.

32. The method as in claim 21, in which said impacting is carried out in a rotatable mill chamber containing cylindrical or spherical elements consisting essentially of copper or iron, said mill chamber being defined with a maximum control dimension extending across a central cross-section of said chamber, said elements having their smallest dimension no greater than 10% of said control dimension.

33. The method as in claim 30, in which said circulation is carried out continuously in an inclined cylinder undergoing movement to translate and agitate said particles through said cylinder, said particles are reduced in temperature to below said ductile-brittle transition temperature by the introduction of liquid nitrogen into the high end of said cylinder to form a slurry in combination with said metallic particles and impacting elements.

34. The method as in claim 33, in which said comminuted, coated and cold worked particles are separated from said slurry by the use of a sieve having a mesh size of −30.

35. The method as in claim 34, in which the openings provided by said sieve are shaped squarely whereby a graded particle distribution is provided in the separated particles.

36. A method of making sintered shapes from metallic particles containing Mn and Si, the steps comprising:
(a) selecting metallic scrap pieces having a surface-to-volume ratio of at least 60:1,
(b) circulating said metallic pieces while cooling them to a temperature below the ductile-brittle transition temperature at one zone of said circulation and allowing said pieces to rise in temperature to above said ductile-brittle transition temperature in another zone of said circulation,
(c) repeatedly impacting said circulating charge of metallic pieces with a plurality of elements in said circulation, each of said elements being laden with a metal which is not brittle at the high range of brittleness experienced by said metallic pieces, said elements being laden with an oxidation protective metal having a melting temperature below but substantially near the liquidus of said particles and being completely soluble in said metal of said particles, said protective metal being abradable by said metallic pieces, said elements having a transverse dimension of at least 50 times the shortest dimension of any of said particles, said impacting by said elements being carried out in said one zone to comminute said pieces by fracture and impart an oxidation protective metal envelope to each of said particles, said elements impacting said pieces in said other zone to impart a controlled degree of surface cold work to each of said particles,
(d) compacting a predetermined quantity of said impacted comminuted particles into a desired shape, and
(e) heating said shape to at least the sintering temperature for said metal particles to permit atomic diffusion to take place between said particles in adjacent contact within said shape, said protective metal envelope about each of said particles prohibiting oxidation of manganese and silicon in said particles during said heating and said cold work surface of each of said comminuted particles promoting increased diffusion.

37. The method as in claim 36, in which said cold work carried out in said other zone is effective to impart a defect site in substantially each of said particles having a size above 124 microns.

38. The method as in claim 36, in which said protective metal laden elements comprise solid copper or iron spheres having a diameter of at least 0.1 inch.

39. The method as in claim 36, in which the metal particles are comprised of ferrous based pieces, some of which contain at least one of manganese, silicon, chromium and vanadium in solid solution, said protective metal envelope about each of said particles operating to prevent oxidation of said manganese, silicon, chromium or vanadium during said heating step.

40. The method as in claim 36, in which said impacting step is carried out by the use of a ball mill and the frequency of contact between said impacting elements and said metal particles being adjusted to achieve a rate of stress over a period of time to provide at least one defect site in the particle sizes above 124 microns in said other zone.

41. The method as in claim 36, in which said ferrous pieces are comprised of machine turnings derived from conventional melted metals having high contents of oxidizable ingredients.

42. A method as in claim 36, in which said charge of metallic particles is comprised of randomly irregular ferrous particles each of which are nonspherical, said shape being heated to a sintering temperature of about 2050° F. and held at said sintering temperature for a period of at least 20 minutes, whereby shrinkage between the cold compacted shape and said sintered shape is at least 7.0%.

43. The method as in claim 14 in which said impacted particles are decreased in carbon content prior to compaction.

44. The method of making sintered shapes as in claim 17 in which said impacted particles are decarburized to a carbon level facilitating better compaction in step (c), said compaction being carried out to promote a density in said shape of at least 6.4 g./cc.

45. The method as in claim 14, in which said impacted particles are coated with copper, said impacted particles being decarburized prior to said coating treatment.

46. The method as in claim 14, in which said impacted particles are coated with iron, said impacted particles being decarburized subsequent to coating but prior to compaction.

47. The method as in claim 1, in which said elements impact said metallic particles causing a local cleansing of the metallic particle surface at the area of impact while simultaneously transferring some of the copper or iron material constituting said elements.

48. A method of making sintered shapes from iron based metallic particles containing oxidizable ingredients, the latter having been cryogenically comminuted, the steps comprising:
(a) repeatedly impacting a charge of said metallic particles with two groups of elements, one group being laden with copper with the elements of said one group being a powder having a transverse dimension no greater than 0.1 inch, the other group having hard elements devoid of copper and having a transverse dimension greater than 0.1 inch, said impacting being continued to simultaneously coat substantially each of said particles with a thin copper envelope and to stress said particles to provide at least one defect site in substantially each of said particles having a size above 120–124 microns,
(b) compacting a predetermined quantity of said impacted particles into a desired shape, and
(c) heating said shape to a sintering temperature for said metal particles in an atmosphere non-oxidizing to said envelope to permit atomic diffusion to take place between particles in adjacent contact within said shape, said copper envelope about each of said particles prohibiting oxidation of the ingredients of said particles during said heating, and said defect sites promoting increased diffusion.

49. A method of making sintered shapes as in claim 48 in which said one group of elements comprise a copper powder and the second group comprise iron spheres.

50. A method of making sintered shapes as in claim 48 in which said particles and two groups of elements are directed along intersecting streams to promote said repeated impaction.

51. The method of making a sintered shape as in claim 48 in which said charge of metallic particles is comprised of both coarse and fine particles, each of said particles having an irregular flake configuration prior to impaction, the fine particles constituting no more than 50% of said total particle volume, most of said fine particles being substantially devoid of defect sites caused by cold work after said impacting step while most of said coarse particles each have at least one defect site after impacting.

52. The method of making sintered shapes as in claim 48 in which the metal particle charge is comprised of ferrous based particles some of which contain manganese and/or silicon in solid solution, said thin copper envelope about each of said particles operating to prevent oxidation of said manganese and silicon during said heating step.

53. A method of making sintered shapes as in claim 48 in which said impacting step is carried out with the use of a ball mill, the rate and frequency of contact between said metal particles and the elements of said ball mill being adjusted to achieve a rate of stress over a period of time to achieve said at least one defect site in the particle sizes above 124 microns.

54. The method of making sintered shapes as in claim 48 in which said compaction step is carried out to produce a green density in said shape compact of at least 6.4 g./cc. by the use of 30 tsi.

55. The method of making sintered shapes as in claim 48 in which said shape has a first volume as a result of said compacting step and has a second volume as a result of said heating step, the difference between said first and second volumes being at least 10%.

56. A method of making sintered shapes as in claim 48 in which said charge of metal particles is comprised of randomly irregular ferrous particles each of which are non-spherical, said shape being heated to a sintering temperature of 2050° F. and held at said sintering temperature for a period of at least 20 minutes, whereby shrinkage between the cold compacted shape and said sintered shape is at least 7.0%.

57. A method of making a powder compact, comprising:
(a) selecting metallic machine turnings comprised substantially of ferrous based material having oxidizable ingredients, said turnings having a surface-to-volume ratio of at least 33:1,
(b) simultaneously refrigerating and impacting said turnings to promote comminution of said metal turnings to a powder,
(c) repeatedly impacting a charge of said powder with two groups of elements, one group being laden with copper and each element thereof having a transverse dimension no greater than 0.1 inch, the other group having hard elements devoid of copper and having a transverse dimension greater than 0.1 inch, said impacting being carried out at ambient temperature conditions to simultaneously coat substantially each of said particles with a thin copper shell and to stress substantially each of said particles above 124 microns to effect cold working therein and to establish at least one defect site in each of said particles above 124 microns, and
(d) compacting a predetermined quantity of said copper coated particles into a desired shape.

58. The method of making a compact as in claim 57 in which said first group of elements consist of copper powder and the second group of elements consist of iron balls having a diameter substantially about 0.5 inches, said copper powder, comminuted powder and iron balls operating within a revolving housing of a ball mill, said housing being rotated so as to impact said copper powder and iron balls with said comminuted particles at a predetermined rate and stress frequency so as to produce said copper coated particles and defect sites therein.

* * * * *